United States Patent
Freeman et al.

(10) Patent No.: US 10,095,812 B2
(45) Date of Patent: Oct. 9, 2018

(54) SYSTEMS AND METHODS FOR PROVIDING CAX DATA

(71) Applicant: Brigham Young University, Provo, UT (US)

(72) Inventors: Robert Freeman, Provo, UT (US); Kelly Eric Bowman, Provo, UT (US); Charles Greg Jensen, Provo, UT (US); Daniel Staves, Orem, UT (US); Joshua Q. Coburn, Orem, UT (US)

(73) Assignee: Brigham Young University, Provo, UT (US)

(*) Notice: Subject to any disclaimer, the term of this patent is extended or adjusted under 35 U.S.C. 154(b) by 323 days.

(21) Appl. No.: 14/925,548

(22) Filed: Oct. 28, 2015

(65) Prior Publication Data

US 2016/0117317 A1    Apr. 28, 2016

Related U.S. Application Data

(60) Provisional application No. 62/069,700, filed on Oct. 28, 2014.

(51) Int. Cl.
*G06F 17/30* (2006.01)
*G06F 17/50* (2006.01)

(52) U.S. Cl.
CPC .......... *G06F 17/50* (2013.01); *G06F 2217/02* (2013.01); *G06F 2217/04* (2013.01)

(58) Field of Classification Search
CPC .................................................. G06F 17/30368
USPC .................................. 707/703, 746; 711/162
See application file for complete search history.

(56) References Cited

U.S. PATENT DOCUMENTS

| | | | | |
|---|---|---|---|---|
| 2005/0220059 A1* | 10/2005 | DelRegno | ............... | H04L 47/10 370/337 |
| 2008/0140734 A1* | 6/2008 | Wagner | ............. | G06F 17/30575 |
| 2008/0244028 A1* | 10/2008 | Le | ............. | G06F 3/0607 709/208 |
| 2008/0270526 A1* | 10/2008 | Barnett | ............. | H04L 67/10 709/203 |
| 2014/0156618 A1* | 6/2014 | Castellano | ............. | G06F 17/30587 707/703 |

\* cited by examiner

*Primary Examiner* — Baoquoc N To
(74) *Attorney, Agent, or Firm* — Kunzler, PC (57) ABSTRACT

A computer-implemented method for providing CAx data may include (1) storing a model of an engineering object as a group of nodes including one or more feature nodes, (2) associating a corresponding transaction history with each feature node, the transaction history indicating one or more states for a feature over time, and (3) determining a state of a selected feature node at a selected point in time by accessing the corresponding transaction history of the selected feature node. Various other methods and systems are also disclosed.

16 Claims, 5 Drawing Sheets

SYSTEMS AND METHODS FOR PROVIDING CAx DATA

CROSS-REFERENCE TO RELATED APPLICATIONS

This application claims the benefit of U.S. provisional application 62/069,700 entitled "State and Transaction Hybrid Storage" and filed on 28 Oct. 2014. The foregoing application is incorporated herein by reference.

BACKGROUND

The subject matter disclosed herein relates to computer-aided technologies (CAx) such as computer-aided design, engineering, analysis and manufacture in general and apparatus, systems, means, and methods for providing CAx data in particular.

CAx systems are often used to design and analyze large and complex engineering models, including many thousands of parts and features. The size and complexity of CAx databases will only increase as CAx systems are rearchitected to accommodate multiple concurrent users.

Because the time of skilled designers and analysts is valuable, any improvement in the time it takes to load and render a model translates directly to cost savings. However, there is often a trade-off between improved time to load and render a model and flexibility and usability features of the CAx system. For example, CAx system users may want to undo or redo previous edits, revert to a previous revision of the CAx model, or copy a previous revision of the model for archival purposes or to copy to another project. Storing the information needed to perform these actions may significantly increase the time needed to load and render a model.

Given the foregoing, what is needed is additional and improved systems and methods for computer-assisted design and analysis of engineering objects, and in particular, systems and methods for providing CAx data. The embodiments disclosed herein were developed in response to these issues.

SUMMARY OF THE INVENTION

As will be described in greater detail below, the subject matter disclosed herein describes various systems and methods for providing CAx data. In one example, a computer-implemented method for providing CAx data, executed by one or more processors, includes: (1) storing a model of an engineering object as a group of nodes including one or more feature nodes, (2) associating a corresponding transaction history with each feature node, the transaction history indicating one or more states for a feature over time, and (3) determining a state of a selected feature node at a selected point in time by accessing the corresponding transaction history of the selected feature node.

In one embodiment, the nodes may include one or more part nodes, each part node a parent of a group of feature nodes. In one embodiment, the nodes are interconnected with a group of dependency references that structure the nodes into a directed graph. In some examples, the computer-implemented method may further include determining the state of a selected part node at the selected point in time by determining, for the selected point in time, the state of each node connected to the part node by a dependency reference in the directed graph.

In one embodiment, the nodes may include one or more assembly nodes, with each assembly node a parent of one or more part nodes. In one embodiment, the nodes are interconnected with a group of hierarchical references that structure the nodes into a hierarchical tree. In one embodiment, a root node of the tree corresponds to an assembly node or a part node.

In some examples, the computer-implemented method may further include rendering or simulating a branch of the hierarchical tree for an identified point in time by: (1) selecting, for rendering or simulation, a branch of the hierarchical tree connected by hierarchical references, (2) identifying a point in time for which the selected branch is to be rendered or simulated, (3) determining the state of each node within the selected branch for the identified point in time, and (4) rendering or simulating the selected branch of the hierarchical tree for the identified point in time.

In some examples, the computer-implemented method may further include compacting the object model by: (1) selecting a time interval for which the transaction history is to be removed from feature nodes in the object model, (2) determining the state of each feature node in the object model at the end of the selected time interval, (3) indicating, in the transaction history, the state of each feature node at the end of the selected time interval, and (4) deleting, from the transaction history, other states of each feature node within the selected time interval. In some examples, the computer-implemented method may further include associating a version identifier with the state of the selected feature node.

In one embodiment, a system for implementing the above-described method may include several modules stored in memory, such as (1) a feature module that stores a model of an engineering object as a group of nodes including one or more feature nodes, (2) a transaction module that associates a corresponding transaction history with each feature node, with the transaction history indicating one or more states for a feature over time, and (3) a state module that determines a state of a selected feature node at a selected point in time by accessing the corresponding transaction history of the selected feature node. The system may also include one or more physical processors configured to execute the feature module, the transaction module, and the state module.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Some of the functional units described in this specification have been labeled as modules, in order to more particularly emphasize their implementation independence.

Others are assumed to be modules. For example, a module or similar unit of functionality may be implemented as a hardware circuit comprising custom VLSI circuits or gate arrays, off-the-shelf semiconductors such as logic chips, transistors, or other discrete components. A module may also be implemented with programmable hardware devices such as field programmable gate arrays, programmable array logic, programmable logic devices or the like.

A module or a set of modules may also be implemented (in whole or in part) as a processor configured with software to perform the specified functionality. An identified module may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, enable the module to achieve the intended purpose for the module.

Indeed, the executable code of a module may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any tangible form capable of enabling execution of a program of machine-readable instructions on a digital processing apparatus. For example, a computer readable medium may be embodied by a flash drive, compact disk, digital-video disk, a magnetic tape, a magnetic disk, a punch card, flash memory, integrated circuits, or other digital processing apparatus memory device. A digital processing apparatus such as a computer may store program codes, associated data, and the like on the computer readable medium that when retrieved enable the digital processing apparatus to execute the functionality specified by the modules.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present disclosure is generally directed to systems and methods for providing CAx data. As will be explained in greater detail below, systems and methods described herein may store a model of an engineering object as a hybrid database that includes a tree structure incorporating assemblies, subassemblies, parts, and features, as well as data structures that facilitate reverting the model to previous states of the model at various points in time during the course of creation. Modifications made to parts or features may be undone and redone, and versions of the model may be tagged at any point in time for later reference.

Figure 1:
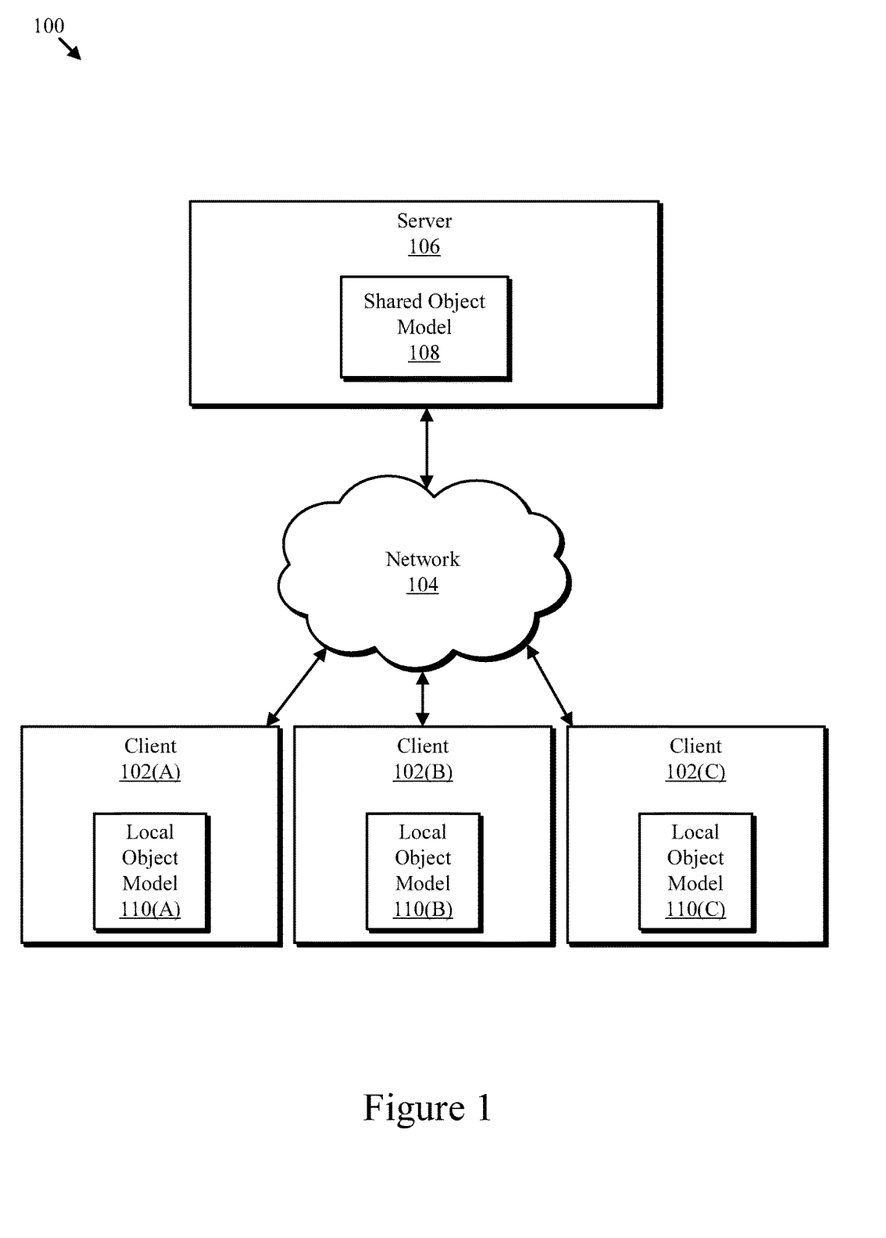
FIG. 1 is a schematic drawing of a system for providing CAx data in accordance with at least one embodiment of the present invention.
Figure 2:
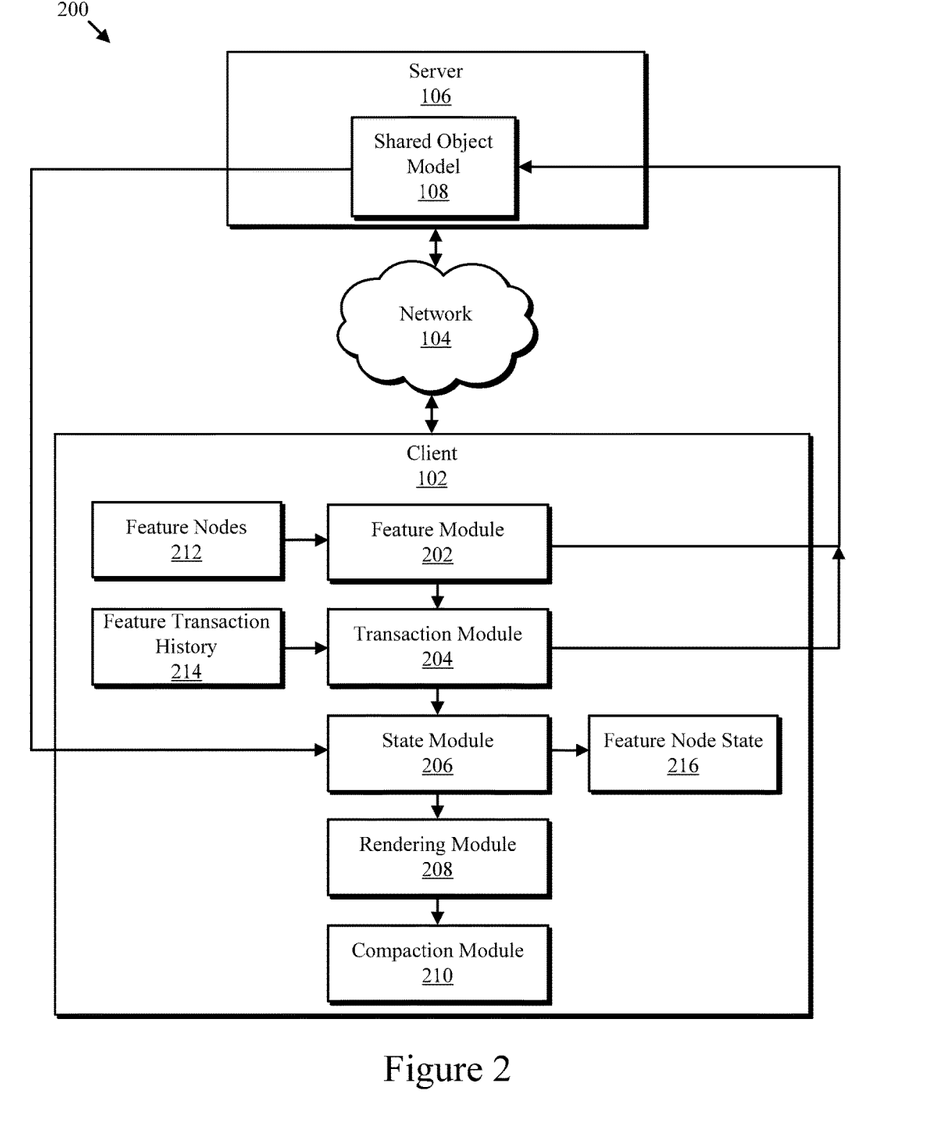
FIG. 2 is a functional block diagram depicting one embodiment of the system for providing CAx data.

The following will provide, with reference to FIGS. 1, and 2, detailed descriptions of example systems for providing CAx data. Detailed descriptions of corresponding computer-implemented methods will also be provided in connection with FIG. 3. Specific examples of CAx operations that leverage the disclosed systems and methods are presented in FIGS. 4 and 5.

FIG. 1 is a schematic drawing of a system 100 wherein multi-user CAx editing may be deployed. As illustrated in this figure, system 100 may include one or more clients 102, a network 104, and a server 106. Server 106 may host a shared (i.e., global) object model 108. Clients 102 may host local model copies 110 that include at least of portion of shared object model 108. In another example, clients 102 may not host local copies of engineering model data, instead accessing data from shared object model 108 on server 106. In another example, each client 102 may have a copy of all or part of the object model database, with features of the CAx system controlling the portion of the database available for editing by each user.

Clients 102 generally represent any type or form of computing device capable of reading computer-executable instructions. Examples of clients 102 include, without limitation, laptops, tablets, desktops, servers, combinations of one or more of the same, or any other suitable computing device.

Server 106 generally represents any type or form of computing device or combinations of computing devices that is capable of storing, comparing, and/or providing data, as well as providing back-end processing services. Server 106 may represent a commercial or publicly-accessible service or a service provided to a single organization. Examples of server 106 include, without limitation, high-performance clusters, virtual machines, application servers, web servers, and/or database servers configured to provide various database services and/or run software applications, or combinations of one or more of the same.

In certain embodiments, server 106 may represent combinations of software applications and physical computing systems configured to perform various tasks. For example, server 106 may include a database server that manages one or more databases, such as shared object model 108. In one example, shared object model 108 may be configured to store geometry, material, load, and/or environment data representing one or more design models. Shared object model 108 may represent portions of a single database or computing device or a plurality of databases or computing devices capable of being accessed by computing devices included in server 106 and/or clients 102.

Network 104 generally represents any medium or architecture capable of facilitating communication or data transfer. Examples of network 104 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like. Network 104 may facilitate communication or data transfer using wireless or wired connections.

In one embodiment, network 104 may facilitate communication between clients 102 and server 106.

FIG. 2 is a functional block diagram depicting one embodiment of a system 200 for providing CAx data. As illustrated in this figure, system 200 may include a client 102 and a server 106 with a shared object model 108. Client 102 may include one or more modules for performing one or more tasks. For example, and as will be explained in greater detail below, system 200 may include a feature module 202 that stores a model of an engineering object as a plurality of nodes that includes one or more feature nodes. System 200 may additionally include a transaction module 204 that associates a corresponding transaction history with each feature node, the transaction history indicating one or more states for a feature over time. System 200 may also include a state module 206 that determines a state of a selected feature node at a selected point in time by accessing the corresponding transaction history of the selected feature node. System 200 may also include a rendering module 208 that renders or simulates all or a portion of the engineering object model for an identified point in time. System 200 may also include a compaction module 210 that compacts the object model database. Although illustrated as separate elements, one or more of modules in FIG. 2 may represent portions of a single module or application. System 200 in FIG. 2 is one specific implementation of system 100 in FIG. 1.

Figure 3:
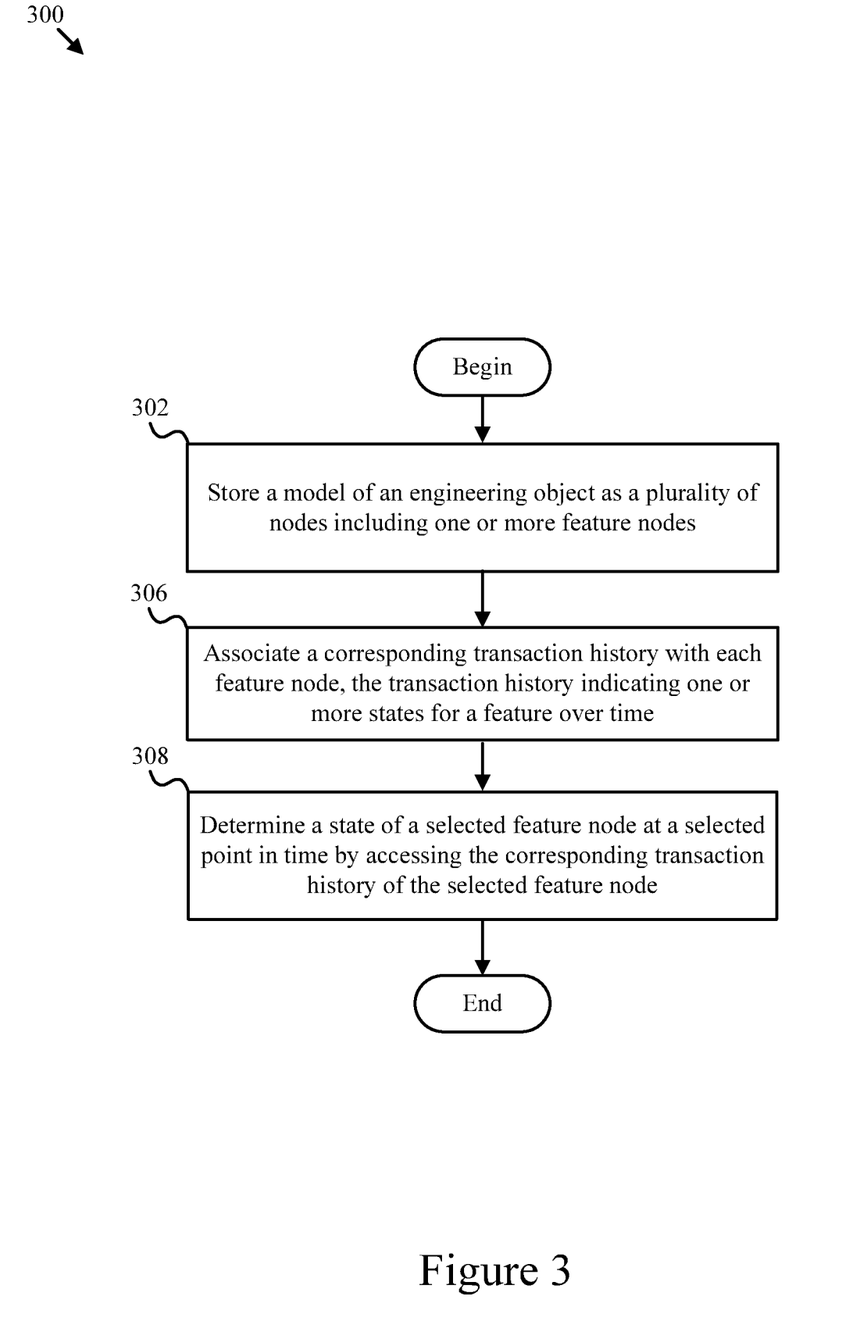
FIG. 3 is a flowchart diagram depicting one embodiment of a method for providing CAx data.

FIG. 3 is a flow diagram of an example computer-implemented method 300 for providing CAx data. The steps shown in FIG. 3 may be performed by any suitable computer-executable code and/or computing system. In some embodiments, the steps shown in FIG. 3 may be performed by the server 106, one or more clients 110, or partitioned across the server 106 and one or more clients 110.

As illustrated in FIG. 3, at step 302, one or more of the systems described herein may store a model of an engineering object as a plurality of nodes including one or more feature nodes. For example, feature module 202 may, as part of client 102 in FIG. 2, store a model of an engineering object in shared object model 108 on server 106 as a plurality of nodes including one or more feature nodes 212.

The term "feature nodes," as used herein, generally refers to data nodes in a linked data structure. Each node may represent a geometry or operation. A group of feature nodes may form a linked data structure that represents a part in an engineering object model.

Feature module 202 may store a model of an engineering object in a variety of ways. For example, feature module 202 may store each feature node 212 as a record in a data table in a database hosted on server 106. Relationships between the feature nodes 212 and other objects in the database may be represented in fields of the feature node record.

In one embodiment, the plurality of nodes may include one or more part nodes, with each part node a parent of a plurality of feature nodes. The plurality of nodes may also include one or more assembly nodes, with each assembly node a parent of one or more part nodes. Depending on the object model, features of the CAx system, and/or the needs of the CAx system user, parts may be combined into subassemblies, which in turn may be combined with each other and/or other parts to form assemblies.

In one embodiment, the plurality of nodes are interconnected with a plurality of hierarchical references that structure the plurality of nodes into a hierarchical tree. For example, an engineering object model may include one or more assemblies, each of which includes one or more parts. Each part may include one or more features. Each feature, part, and assembly may be represented in the engineering object model as a node, with the relationships between the nodes represented by database links forming a hierarchy. In one embodiment, a root node of the tree corresponds to an assembly node or a part node.

Figure 4:
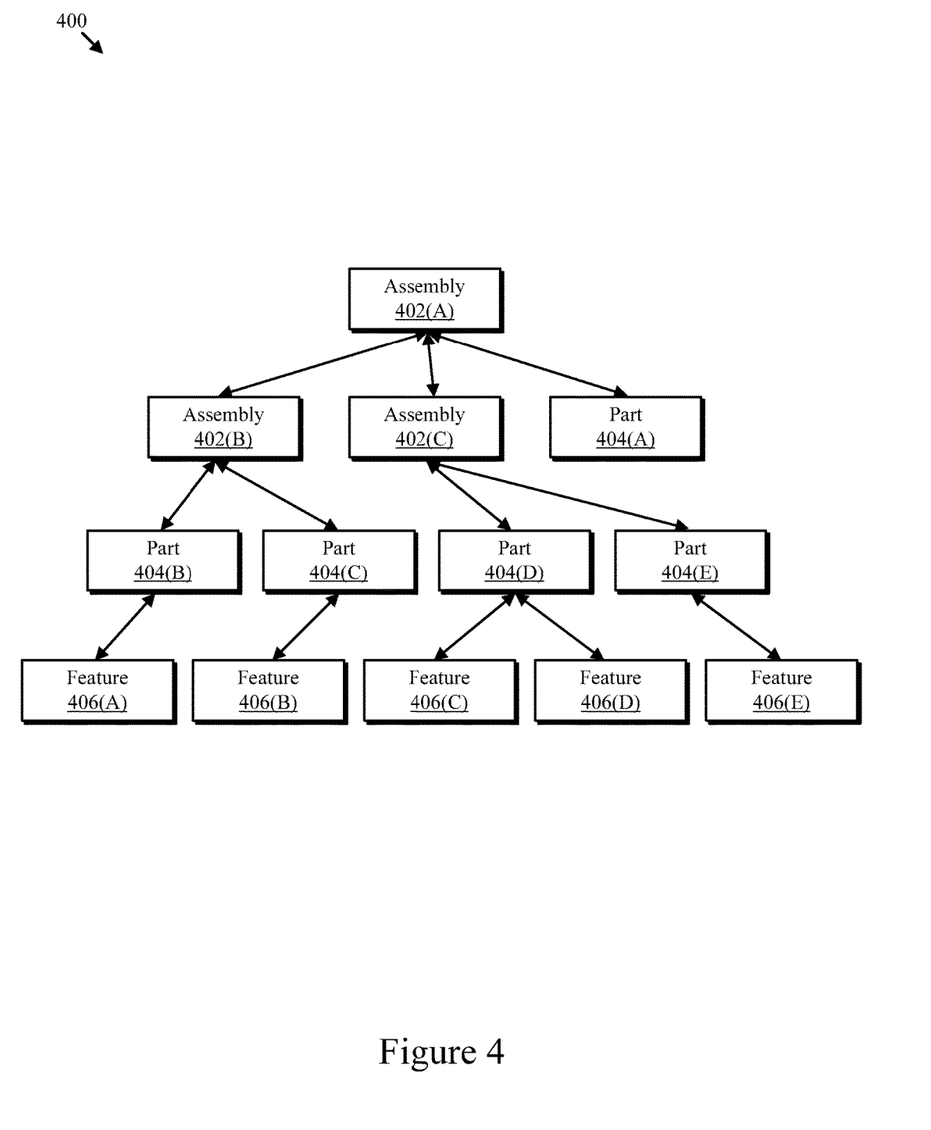
FIG. 4 is a block diagram depicting a hierarchical data structure within a design model in accordance with at least one embodiment of the present invention.

FIG. 4 is a block diagram depicting a hierarchical data structure 400 within a design model. As shown in FIG. 4, the hierarchical data structure 400 includes an assembly 402(A) that serves as the root of the tree representing the design object. Assembly 402(A) comprises two assemblies 402(B) and 402(C) and one part 404(A). Assemblies 402(B) and 402(C) may be considered to be subassemblies of assembly 402(A). Assembly 402(B) comprises two parts, 404(B) and 404(C). Assembly 402(C) comprises parts 404(D) and 404(E). Part 404(B) includes feature 406(A). Part 404(C) includes feature 406(B). Part 404(D) includes two features 406(C) and 406(D). Part 404(E) includes feature 406(E). The hierarchical references between the features, parts, and assemblies of hierarchical data structure 400 are represented by arrows connecting the boxes representing each component of the object model depicted in FIG. 4.

At step 304, one or more of the systems described herein may associate a corresponding transaction history with each feature node, with the transaction history indicating one or more states for a feature over time. For example, transaction module 204 may, as part of client 102 in FIG. 2, associate a corresponding feature transaction history 214 with each feature node 212 in shared object model 108 on server 106. The transaction history may indicate one or more states over time for a feature corresponding to a feature node 212.

The term "state," as used herein, generally refers to one or more data values for a geometry or operation at a specific time. The state of a feature changes as CAx operations modify the feature. For example, a feature node for an extrude operation may include direction and distance values for the extrusion. The state of the extrude node at a given time may then include direction and distance values for the specified point in time.

The term "transaction history," as used herein, generally refers to records of the state of a feature over time. For example, a feature node for an extrude operation may have a transaction history that records the direction and distance values for the node at the time the extrusion node was created. The transaction history may also include additional direction and distance values representing the state of the extrude node at various points in time that the node was modified. The transaction history may also include a flag with a time stamp indicating when the node was deleted.

Transaction module 204 may associate a transaction history with a feature node in any suitable manner. For example, transaction module 204 may maintain a transaction history table for each feature node, with each record in the transaction history table including a time stamp and one or more data fields containing data representing the state of the associated feature at the specified time. As CAx system operations modify the feature, transaction module 204 may update the transaction history table with the current feature state.

At step 306, one or more of the systems described herein may determine a state of a selected feature node at a selected point in time by accessing the corresponding transaction history of the selected feature node. For example, state module 206 may, as part of client 102 in FIG. 2, determine feature node state 216 of a feature node 212 in shared object model 108 on server 106 at a selected point in time by accessing the corresponding feature transaction history 214 for the selected feature node 212.

State module 206 may determine the state of a feature node in a variety of ways. For example, state module 206 may search a feature node's transaction history for the most recent state of the feature node before the specified point in time. State module 206 may determine the current state of a feature node by retrieving the last entry in the feature node's transaction history.

In one embodiment, the plurality of nodes are interconnected with a plurality of dependency references that structure the plurality of nodes into a directed graph. The term "dependency reference," as used herein, generally refers to relationships between nodes in the design model that represent relationships between the parts and features that constitute the design model. For example, the features that make up a part may include geometries that must be created and operations that must be performed in a specific order. The relationships between the geometries and operations are dependencies that may be represented by edges in a graph connecting the feature nodes. The term "directed graph," as used herein, generally refers to a representation of the nodes of an object model, connected by edges representing the dependency references between the nodes.

Figure 5:
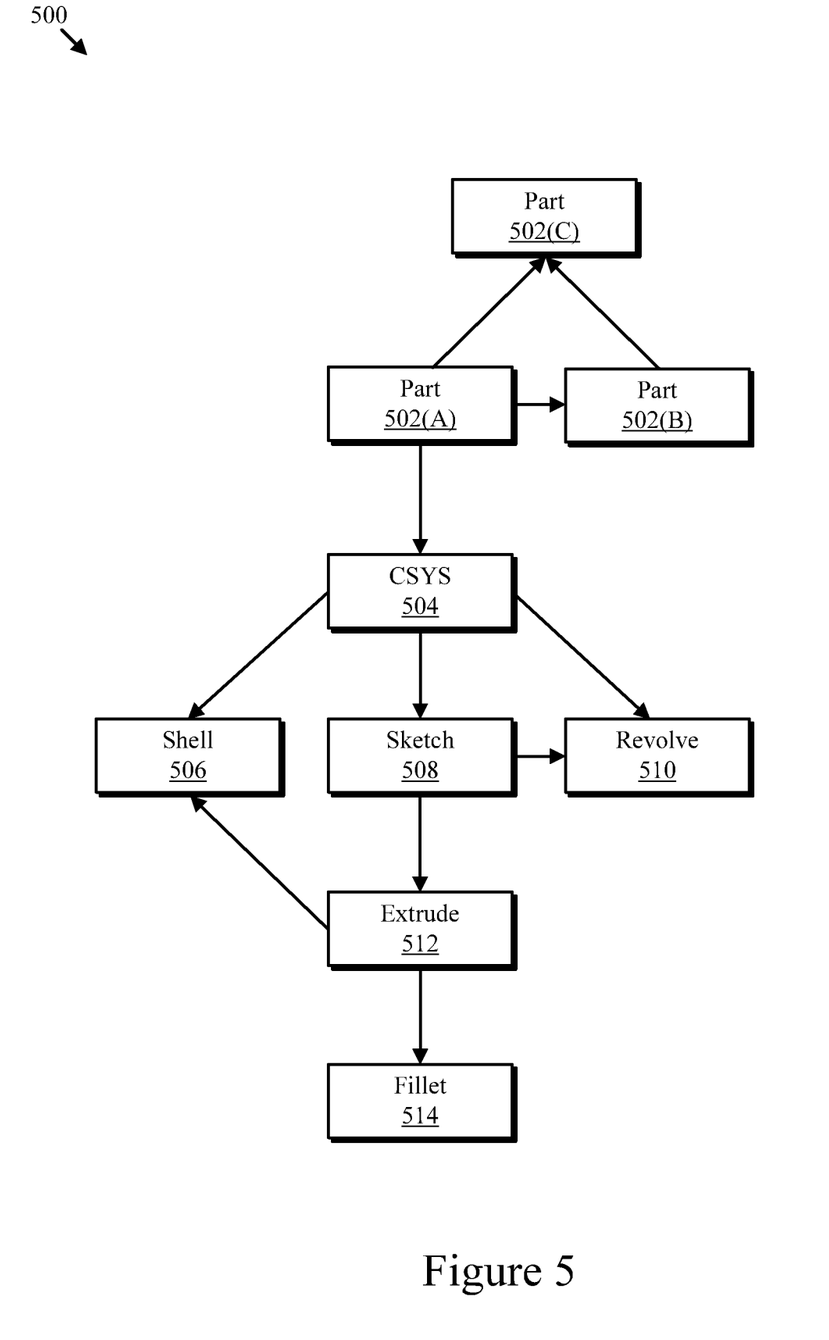
FIG. 5 is a block diagram depicting a directed graph data structure within a design model in accordance with at least one embodiment of the present invention.

FIG. 5 is a block diagram depicting a directed graph data structure 500 within a design model. As depicted in FIG. 5, directed graph data structure 500 may include three parts, 502(A), 502(B), and 502(C). The features of parts 502(B) and 502(C) are not shown. Part 502(A) includes a node, CSYS 504, that specifies a coordinate system for the part. Part 502(A) includes a sketch feature 508 that specifies a geometry for the part. Part 502(A) also includes operation feature nodes, shell 506, revolve 510, extrude 512, and fillet 514 that represent operations the CAx system performs on sketch 508 to create part 502(A). The dependencies between the features are represented by arrows in directed graph data structure 500. Since the design of a part typically must be deterministic, CAx systems typically require the directed graph of a part to be acyclic. Notwithstanding the forgoing, assemblies may introduce cycles into the directed graph. The arrow between parts 502(A), 502(B), and 502(C) may represent spatial constraints between the parts. In another example, a spatial constraint may be represented by a feature node belonging to a part. Since parts may be interconnected, the dependency references between parts and assemblies may be cyclic, as depicted with parts 502(A), 502(B), and 502(C).

In some examples, systems described herein may include determining the state of a selected part node at the selected point in time by determining, for the selected point in time, the state of each node connected to the part node by a dependency reference in the directed graph. For example, state module 206 may, as part of client 102 in FIG. 2, determine a state for a part node in shared object model 108 on server 106 by determining, for a selected point in time, the state of each node connected to the part node by a dependency reference in the directed graph. For example, as shown in FIG. 5, state module 206 may determine the state of part 502(A) at a specified point in time by determining the state of feature nodes CSYS 504, sketch 508, shell 506, revolve 510, extrude 512, and fillet 514 at the specified point in time. As described above, determining the state of each feature node at the specified point in time may include identifying the entry in the feature node's transaction history most recent to the specified point in time. State module 206 may determine the current state of part 502(A) by identifying the last entry in the transaction history of each of the feature nodes that form part 502(A).

In some examples, systems described herein may include rendering or simulating a branch of the hierarchical tree for an identified point in time by: (1) selecting, for rendering or simulation, a branch of the hierarchical tree connected by hierarchical references, (2) identifying a point in time for which the selected branch is to be rendered or simulated, (3) determining the state of each node within the selected branch for the identified point in time, and (4) rendering or simulating the selected branch of the hierarchical tree for the identified point in time. For example, rendering module 208 may, as part of client 102 in FIG. 2, render or simulate a branch of an object model at a specified point in time by determining the state of each node within the branch of the hierarchical tree representing the object model at the specified point in time, then rendering or simulating the nodes at the specified point in time. For example, rendering module 208 may render assembly 402(B) in FIG. 4 at a specific point in time by identifying the states of feature nodes 406(A) and 406(B), part nodes 404(B) and 404(C), and assembly node 402(B) at the specific point in time. Rendering module 208 may then render each of the nodes at the identified states. Methods for determining the state of feature, part, and assembly nodes are described in greater detail above.

In some examples, systems described herein may include compacting the object model by (1) selecting a time interval for which the transaction history is to be removed from feature nodes in the object model, (2) determining the state of each feature node in the object model at the end of the selected time interval, (3) indicating, in the transaction history, the state of each feature node at the end of the selected time interval, and (4) deleting, from the transaction history, other states of each feature node within the selected time interval. For example, compaction module 210 may, as part of system 200 in FIG. 2, compact shared object model 108 on server 106 for a specified time interval by determining the state of nodes in shared object model 108 at the end of the time interval and deleting all but the last entry in the transaction history for the node in the specified time interval.

Compacting an object model database may be desirable to reduce storage requirements for the database. Because compacting the database deletes transaction history records for a specific time interval, database compaction may be desirable only after transactions during the time interval are no longer useful. For example, compaction module 210 may be programmed to compact a database monthly to include state changes made in the previous month during one-hour intervals, and state changes made in one-day intervals after one year. In another example, compaction module 210 may be instructed to remove all transaction records before a specific date, after the object model database has been archived. In another example, compaction module 210 may be instructed to remove data associated with parts that were deleted more than one month previous.

In some examples, systems described herein may include associating a version identifier with the state of the selected feature node. For example, when a CAD model is ready for release to manufacturing, state module 206 may associate a version number with the current state of each feature node in the object database. In another example, state module 206 may associate a version identifier with each transaction record in the object database for a specific point in time, to facilitate retrieving the state of each feature in the object model at that point in time.

The hierarchical storage model constructed and maintained by systems and methods described herein may also facilitate more rapid loading and rendering of an object model than CAx systems that store the object model as a series of transactions. Systems and methods described herein may also facilitate operations requiring knowledge of the transaction history of a part or feature, such as operation undo and redo, or reverting all or part of an object model to a previous state. Maintaining transaction history in the object database may also facilitate recovery after a database becomes corrupted.

It should also be understood that this description is not intended to limit the invention. On the contrary, the example embodiments are intended to cover alternatives, modifications, and equivalents, which are included in the spirit and scope of the invention as defined by the appended claims. Further, in the detailed description of the example embodiments, numerous specific details are set forth in order to provide a comprehensive understanding of the claimed invention. However, one skilled in the art would understand that various embodiments may be practiced without such specific details.

Although the features and elements of the present example embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, executed by one or more processors, the method comprising:
    storing a model of an engineering object as a plurality of nodes comprising one or more feature nodes, wherein the plurality of nodes are interconnected with a plurality of hierarchical references that structure the plurality of nodes into a hierarchical tree;
    associating a corresponding transaction history with each feature node, the transaction history indicating one or more states for a feature over time;
    determining a state of a selected feature node at a selected point in time by accessing the corresponding transaction history of the selected feature node; and
    rendering or simulating a branch of the hierarchical tree for an identified point in time by selecting, for rendering or simulation, a branch of the hierarchical tree connected by hierarchical references, identifying a point in time for which the selected branch is to be rendered or simulated and determining the state of each node within the selected branch for the identified point in time.

2. The method of claim 1, wherein the plurality of nodes comprises one or more part nodes, each part node a parent of a plurality of feature nodes.

3. The method of claim 2, wherein the plurality of nodes are interconnected with a plurality of dependency references that structure the plurality of nodes into a directed graph.

4. The method of claim 3, further comprising determining the state of a selected part node at the selected point in time by determining, for the selected point in time, the state of each node connected to the part node by a dependency reference in the directed graph.

5. The method of claim 2, wherein the plurality of nodes comprises one or more assembly nodes, each assembly node a parent of one or more part nodes.

6. The method of claim 5, wherein a root node of the tree corresponds to an assembly node or a part node.

7. The method of claim 1, further comprising compacting the object model by:
    selecting a time interval for which the transaction history is to be removed from feature nodes in the object model;
    determining the state of each feature node in the object model at the end of the selected time interval;
    indicating, in the transaction history, the state of each feature node at the end of the selected time interval; and
    deleting, from the transaction history, other states of each feature node within the selected time interval.

8. The method of claim 1, further comprising associating a version identifier with the state of the selected feature node.

9. A system comprising:
    a feature module, stored in memory, that stores a model of an engineering object as a plurality of nodes comprising one or more feature nodes, wherein the plurality of nodes are interconnected with a plurality of hierarchical references that structure the plurality of nodes into a hierarchical tree;
    a transaction module, stored in memory, that associates a corresponding transaction history with each feature node, the transaction history indicating one or more states for a feature over time;
    a state module, stored in memory, that determines a state of a selected feature node at a selected point in time by accessing the corresponding transaction history of the selected feature node;
    a rendering module, stored in memory, that renders or simulates a branch of the hierarchical tree for an identified point in time by selecting, for rendering or simulation, a branch of the hierarchical tree connected by hierarchical references, identifying a point in time for which the selected branch is to be rendered or simulated and determining the state of each node within the selected branch for the identified point in time; and
    at least one physical processor configured to execute the feature module, the transaction module, the rendering module, and the state module.

10. The system of claim 9, wherein the plurality of nodes comprises one or more part nodes, each part node a parent of a plurality of feature nodes.

11. The system of claim 10, wherein the plurality of nodes are interconnected with a plurality of dependency references that structure the plurality of nodes into a directed graph.

12. The system of claim 11, wherein the state module determines the state of a selected part node at the selected point in time by determining, for the selected point in time, the state of each node connected to the part node by a dependency reference in the directed graph.

13. The system of claim 10, wherein the plurality of nodes comprises one or more assembly nodes, each assembly node a parent of one or more part nodes.

14. The system of claim 13 wherein a root node of the tree corresponds to an assembly node or a part node.

15. The system of claim 9, further comprising a compaction module, stored in memory, that compacts the object model by:
    selecting a time interval for which the transaction history is to be removed from feature nodes in the object model;

determining the state of each feature node in the object model at the end of the selected time interval;
indicating, in the transaction history, the state of each feature node at the end of the selected time interval;
deleting, from the transaction history, other states of each feature node within the selected time interval.

16. The system of claim 9, wherein the state module associates a version identifier with the state of the selected feature node.

\* \* \* \* \*